United States Patent [19]

Hofmann et al.

[11] 4,235,536

[45] Nov. 25, 1980

[54] MICROFILM READER

[75] Inventors: Wilfried Hofmann; Herbert Lusch, both of Taufkirchen; Walter Rauffer, Munich, all of Fed. Rep. of Germany

[73] Assignee: AGFA-Gevaert, A.G., Munich, Fed. Rep. of Germany

[21] Appl. No.: 36,494

[22] Filed: May 7, 1979

[30] Foreign Application Priority Data

May 11, 1978 [DE] Fed. Rep. of Germany ....... 2820537

[51] Int. Cl.³ ...................... G03B 23/12; G03B 21/22
[52] U.S. Cl. .................................. 353/27 R; 353/78; 353/73; 353/82; 353/119
[58] Field of Search .................... 353/27 R, 77, 78, 82, 353/72, 73, 119

[56] References Cited

U.S. PATENT DOCUMENTS

| 3,781,102 | 12/1973 | Chandler | 353/27 R |
| 4,129,364 | 12/1978 | Dietz | 353/119 |

Primary Examiner—Steven L. Stephan

[57] ABSTRACT

A microfilm reader is provided which comprises two casings. The first casing comprises selection means for selecting a micropicture as well as means providing a projection beam for imaging the positioned micropicture through at least one selected orifice in the first casing. The second casing comprises at least one orifice for receiving the projection beam carrying the micropicture information and projection means for displaying the received micropicture information. The two casings can be attached in dual position and by proper positioning of mirrors the projection beam passes through matched orifices of the two casings. The remaining orifices are covered with covers.

12 Claims, 2 Drawing Figures

MICROFILM READER

BACKGROUND OF THE INVENTION

1. Field of the Invention

The present invention relates to a microfilm reader with provisions for selecting a micropicture from a multitude of micropictures on a microfilm carrier and for positioning the micropicture in an imaging light beam with an illuminating section for illuminating the selected micropicture and with a section for projecting the micropicture on a projection surface.

2. Description of the Prior Art

Microfilm readers are known. They usually comprise an illuminating section, a positioning device for the micropicture an objective and a projection screen. The term 'micropicture' defines a so-called microfiche, a microroll film or a microfilm-jacket.

SUMMARY OF THE INVENTION

1. Purposes of the Invention

It is an object of the invention to provide a microfilm reader which saves space and which can provide for a multitude of applications.

It is another object of the invention to provide a microfilm reader which can be easily serviced. These and other objects and advantages of the present invention will become evident from the description which follows.

2. Brief Description of the Invention

A microfilm reader is provided which comprises a first casing and a second casing. The first casing comprises selection means for selecting a micropicture from a plurality of micropictures on a microfiche and positioning means for positioning said micropicture as well as means providing a projection beam for imaging the positioned micropicture. The first casing further comprises at least two orifices capable of radiating the projection beam carrying the micropicture information and at least one deflection mirror for deflecting the micropicture information through a selected orifice. The second casing comprises at least one orifice for receiving the projection beam carrying the micropicture information and projection means for displaying the received micropicture information. Furthermore, means is provided for attaching the first casing in at least two ways to the second casing with one orifice of the first casing matching one orifice of the second casing in order to transfer the projection beam carrying the micropicture information from the first casing to the second casing. The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which is shown one of the various possible embodiments of the invention

DETAILED DESCRIPTION OF THE INVENTION AND OF THE PREFERRED EMBODIMENTS

Figure 1:
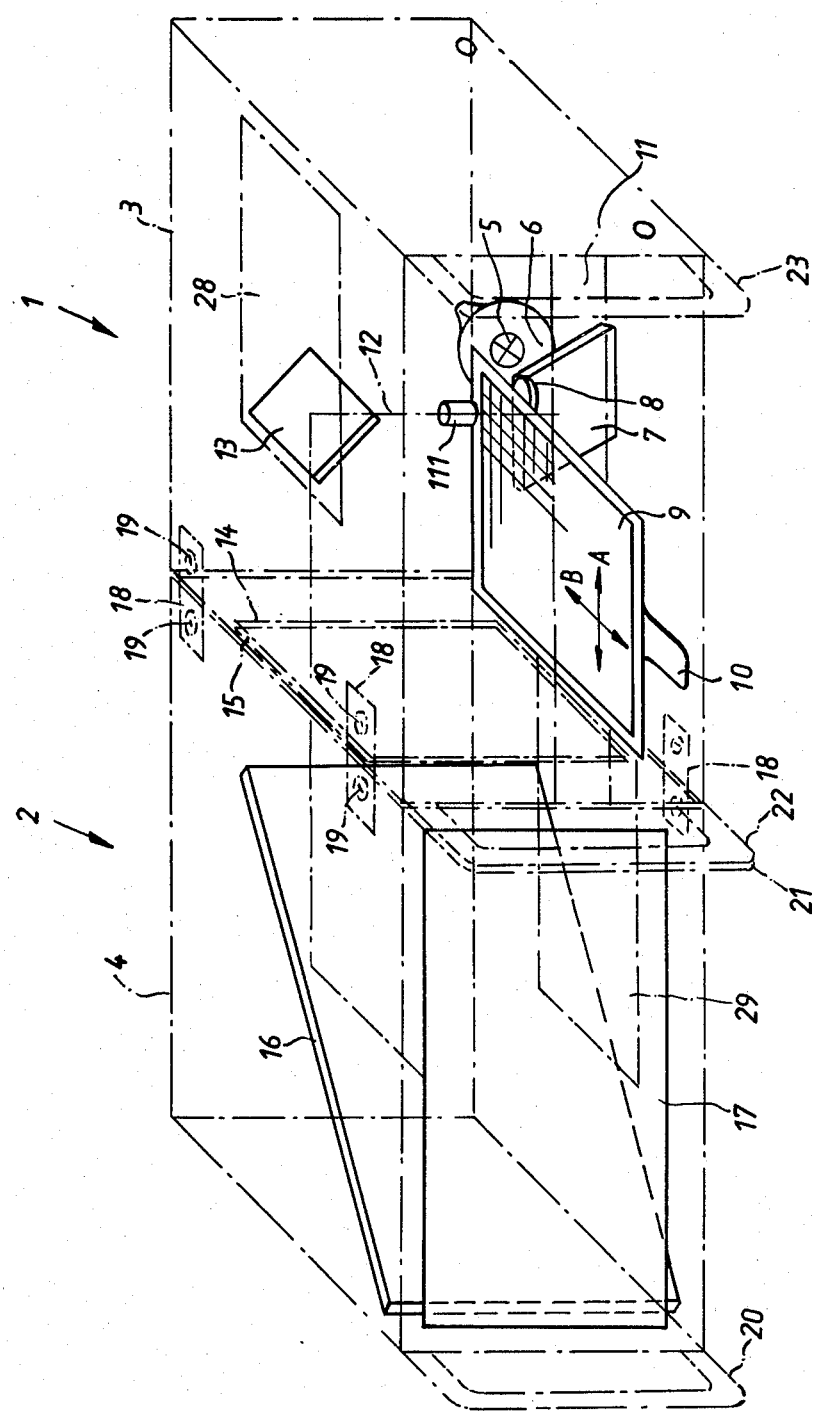
FIG. 1 is a perspective schematic front elevational view of a microfilm reader according to the present invention with two casings arranged side by side.

The microfilm reader of the present invention comprises at least two units with individual casings. The first unit comprises at least the selection and positioning devices and the second unit at least comprises the projection screen. The two units are in at least two different relative positions combinable into an operable microfilm reader. The two casings are provided with orifices for passing the projection beam from the first unit to the second unit in each of the operable combinations. At least one deflecting mirror is provided for deflecting the projection beam according to the choice of the operating combination for adapting the microfilm reader in accordance with the space requirements from the individual units to an operating unit which is optimally adapted to the available space.

It is especially advantageous when the two units are in a first operating combination placed side by side and when the two units are in a second operating combination placed on top of each other. This allows with a single set to obtain a flat, broad, narrow or high form as desired. it can be another advantage to have the casings of the two units of such dimensions adapted to slide-in standardized slide-in racks with standard width and to have on the outside of the casings provisions for the attachment to the slide-in racks. For example, the casings of the two units can be of such dimensions as to fit in the usual 19 inch slide-in racks. This provides the advantage that the apparatus can be easily integrated in the set up with other electronic slide-in units such as amplifiers, power supplies, oscilloscopes and the like. Preferably the first casing is capable of being attached to the second casing in a first operating position with the two cases each intersecting a horizontal line and in a second operating position with the two cases each intersecting a vertical line. Preferably the two casings are of approximately equal size and of approximately equal shape. In another preferred embodiment the first casing has a front side providing access to controls for selection means and for positioning means and wherein the second casing has a front side incorporating a projection screen. Preferably, in both operating positions the front sides of both the first casing and of the second casing are in the same direction and the casings are suitable for being placed in a rack. Also means can be provided for retaining the casings in the rack and holders can be provided on two sides for placing the casing manually into the rack. Also, the orifices not employed in the transfer of the projection beam can be closable. Means can be provided for connecting the two casings in the desired operating position.

The first casing can comprise illumination means for illuminating the micropicture; positioning means for adjusting the position of the microfilm picture relative to the projection beam; an imaging objective and a deflecting mirror located spacially close to the imaging objective for selectively directing the projection beam in alternate directions.

The second casing can comprise at least one mirror and a translucent projection surface. At least one of the deflecting mirrors can be attached to a cover closing an orifice of the casings.

Figure 2:
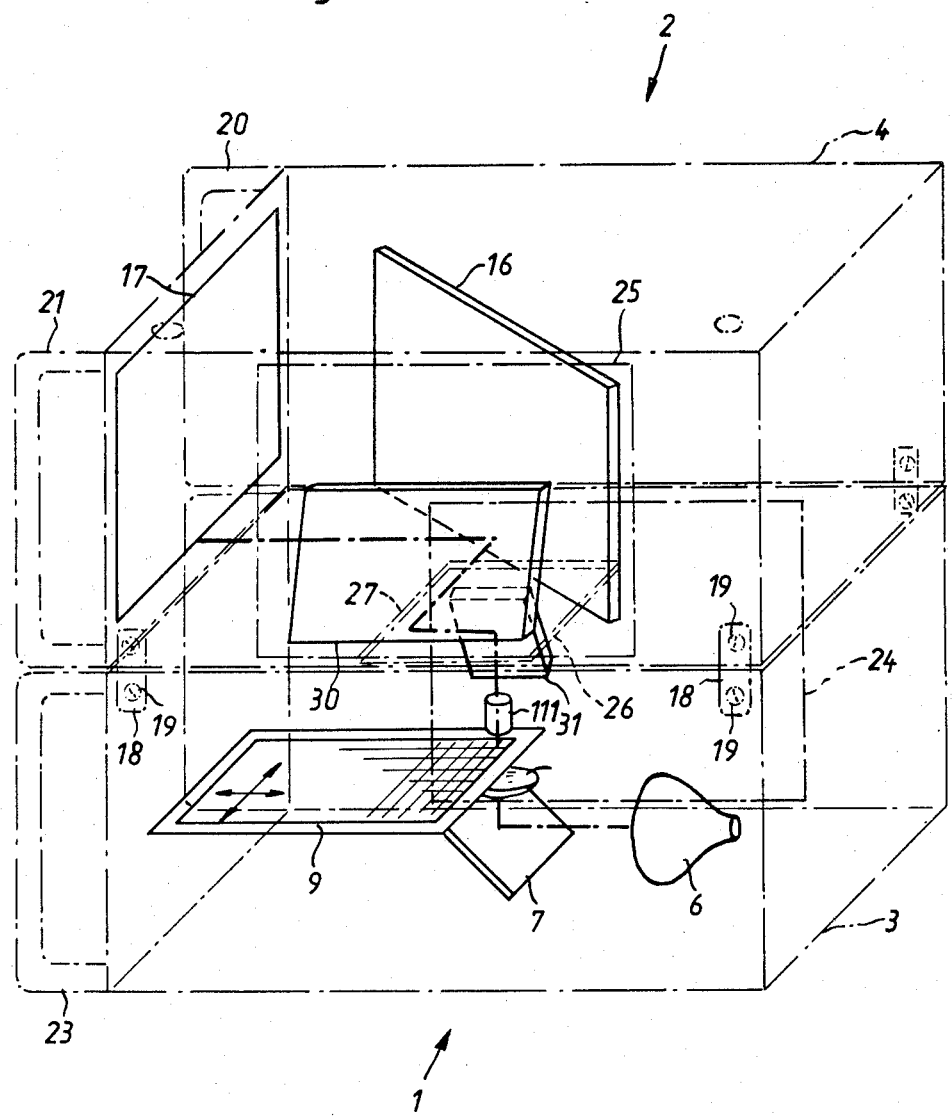
FIG. 2 is a perspective schematic side elevational view of a microfilm reader according to FIG. 1 with two casings placed on top of each other.

Referring now to FIGS. 1 and 2, there are shown two connectable units 1 and 2. FIG. 1 the two units are side by side. Each of the units comprises a casing 3 and 4, respectively, and the two casing have the same overall dimensions. The height of the apparatus shown in FIG. 1 is about 138 mm, the depth is about 290 mm and the width is about 19 inches.

The casing 3 houses an illumination unit for micropictures, which comprises an illumination lamp 5, a reflector 6, a deflecting mirror 7 and a condensor lens 8.

The mircofilm support 9 is adapted to take up microfiches 32 and can be moved in conventional manner (not shown) in two mutually orthogonal directions A, B. The microfilm support 9 protrudes at least with an attached handle 10 through a slot 11 in the front of the casing for allowing the operator to position the microfilm support 9 in such a manner as to bring the micropicture of interest into the projection beam.

There is placed an imaging objective 111 above the micropicture to be projected, which defines a projection beam 12 which is deflected by a deflection mirror 13 located above the imaging objective 111 and through the opening 14 in the side wall of the casing 3 as well as through an opening 15, which is congruent to the opening 14 and which is located in the side wall of the casing 4 which is next to the side wall of the casing 3 with the opening 14. A deflection mirror 16 in the casing 4 receives the projection beam and deflects it to a transilluminated projection screen 17 located in the front side of the casing 4.

The casings 3 and 4 are in the embodiment of FIGS. 1 and 2 and are provided with flaps 18 which are attached by means of screws 19 to the casings 3 and 4 and which thereby keep the units 1 and 2 together as one handling unit. Of course other desired and suitable connecting elements can be employed. For easier handling of the apparatus or of the individual units, respectively, handles 20 to 23 are attached to the left and right sides of the front side of the two units. The apparatus is held in the slide-in rack by L-shaped rails.

In order to obtain a particularly flat and space saving building height for the apparatus of the invention an asymmetric use is provided for the projection beam path. The axial beam 12 of the objective 111 is beamed normal to the projection screen 17, however not on its center but on its upper fringe range. Thus, as viewed from the projection screen 17, only the lower half of the projection beam path is used.

The units 1 and 2 are arranged on top of each other in FIG. 2 and are again connected with flaps 18 and screws 19. The openings 14 and 15 in the side walls of the casings (see FIG. 1) are here closed with covers. For passage of the projection beam from unit 1 to unit 2 there is provided on the top of the casing 3 on opening 26 and in the bottom of casing 4 and opening 27, which is congruent with opening 26. Employing the units as shown in FIG. 1, there are closed these openings with covers 28 and 29, respectively, and the deflection mirror 13 is attached to the cover 28.

The cover 25 supports a deflection mirror 30 as well as another deflection mirror 31 (not shown) close to the objective. The two deflection mirrors are arranged to deflect the projection beam from the imaging objective via the deflection mirror 31 and the deflection mirror 30 to the deflection mirror 16 and from there to the projection screen. Similarly in the arrangement of FIG. 2 of the units 1 and 2 the objective is used asymmetrically. The axial beam is orthogonal to the lower area of the projection screen.

As shown above, for changeover from one arrangement to the other arrangement of the two units there is only required the loosening of the two screw connections 18 and 19, the orifices not used are covered with appropriate covers, the two other covers are removed from the orifices required for passing the projection beam and finally the screw connections are put in the place corresponding to the new arrangement. By selectively removing and installing the required covers there is simultaneously put in place the required arrangement of the deflection mirrors. Alternatively it is possible to replace the two optionally used deflection mirrors 13 and 31 by a single deflection mirror tiltably mounted on the casing 3, which can be tilted in the proper position depending on the selected operating position.

Since the mirror 13 being closely spaced with respect to the objective and the orifice 14 in the sidewall of the casing 3, the unit 1 is also suitable for providing a wall projection.

It thus will be seen that there is provided a device which achieves the various objects of the invention and which is well adapted to meet the conditions of practical use.

As various possible embodiments might be made of the above invention, and as various changes might be made in the embodiment set forth above, it is to be understood that all matter herein described or shown in the accompanying drawings is to be interpreted as illustrative and not in a limiting sense.

What is claimed is:

1. A microfilm reader, comprising in combination, a first casing comprising selection means for selecting a micropicture from a plurality of micropictures on a micropicture carrier;

positioning means for positioning said micropicture;

projection beam means providing a projection beam for imaging said micropicture;

said first casing having at least a side surface and a top surface and at least two orifices, each capable of permitting the passage therethrough of the projection beam carrying the micropicture information which emanates from said projection beam means; and at least one deflection mirror for deflecting the projection beam carrying the micropicture information through a selected orifice; said orifaces being positioned in two different surfaces of said first casing, said first casing having an orientation during use wherein one of said surfaces is the top surface and the other said surface is one of the side surfaces;

a second casing comprising at least one orifice for receiving the projection beam; and a screen displaying the received micropicture information; and means for attaching the second casing to the first casing in at least two different orientations with one orifice of the first casing matching one orifice of the second casing in each orientation in order to transfer the projection beam carrying the micropicture information from the first casing to the second casing and wherein in the first orientation the second casing is placed adjacent the first casing aligned along a horizontal axis and in the second orientation the second casing is placed on top of the first casing such that the two casings are aligned along a vertical axis.

2. The microfilm reader as set forth in claim 1 wherein the first casing and the second casing are of about equal size.

3. The microfilm reader as set forth in claim 3, wherein the first casing is capable of being attached to the second casing in a first operative position in which the two casings are being horizontally aligned along a horizontal axis and in a second operative position in which the two casings are being vertically aligned along a vertical axis; and wherein in both operative positions the front sides of both the first casing and of the second casing are oriented in the same direction.

4. The microfilm reader as set forth in claim 1, wherein the first casing and the second casing are of about equal shape.

5. The microfilm reader as set forth in claim 1, wherein the first casing has a front side providing access to controls for selection means and for positioning means; and wherein the second casing has a front side incorporating the projection screen.

6. The microfilm reader as set forth in claim 5, wherein the casings are suitable for placement in a rack.

7. The microfilm reader as set forth in claim 6, wherein the casings are provided with means for retaining the casings in a rack.

8. The microfilm reader as set forth in claim 6, wherein each of the casings has at least one holder for manually placing the casing into a rack.

9. The microfilm reader as set forth in claim 1, wherein those orifices which are not employed in the transfer of the projection beam are closable.

10. The microfilm reader as set forth in claim 1, wherein the first casing comprises illumination means for providing a projection beam illuminating the micropicture and wherein the positioning means adjusts the position of the microfilm picture relative to the projection beam, and comprising an imaging objective for the microfilm picture; and a deflection mirror mounted in said first casing spacially close to the imaging objective for selectively directing the projection beam in alternate directions.

11. The microfilm reader as set forth in claim 10, wherein the second casing comprises at least one mirror; and a translucent projection surface.

12. The microfilm reader as set forth in claim 1, wherein at least one of the deflecting mirrors is attached to a cover closing an orifice of the casings.

* * * * *